United States Patent
Clark et al.

(10) Patent No.: US 7,937,574 B2
(45) Date of Patent: May 3, 2011

(54) PRECISE COUNTER HARDWARE FOR MICROCODE LOOPS

(75) Inventors: Michael T. Clark, Austin, TX (US); Jelena Ilic, Austin, TX (US); Syed Faisal Ahmed, Austin, TX (US); Michael T. DiBrino, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 356 days.

(21) Appl. No.: 11/778,936

(22) Filed: Jul. 17, 2007

(65) Prior Publication Data
US 2009/0024842 A1 Jan. 22, 2009

(51) Int. Cl.
*G06F 9/26* (2006.01)
(52) U.S. Cl. ......................................... 712/241
(58) Field of Classification Search ............ None
See application file for complete search history.

(56) References Cited

U.S. PATENT DOCUMENTS

| | | | |
|---|---|---|---|
| 5,898,865 A | 4/1999 | Mahalingaiah | |
| 5,898,866 A * | 4/1999 | Atkins et al. | 712/241 |
| 6,003,128 A | 12/1999 | Tran | |
| 6,014,741 A | 1/2000 | Mahalingaiah | |
| 6,032,252 A | 2/2000 | Petro et al. | |
| 7,366,885 B1 * | 4/2008 | Radhakrishnan et al. | 712/241 |
| 2004/0193858 A1 * | 9/2004 | Ahmad et al. | 712/241 |

OTHER PUBLICATIONS

Patterson, David. Hennessy, John. "Computer Architecture: A Quantitative Approach". Morgan Kaufmann Publishers, Inc. Second Edition, 1996. pp. 161-169.*
Mayer, Herb. "Loop Instruction in x86". Mar. 17, 2003. 5 pages.*

* cited by examiner

*Primary Examiner* — Robert Fennema
(74) *Attorney, Agent, or Firm* — Lawrence J. Merkel; Meyertons, Hood, Kivlin, Kowert & Goetzel, P.C.

(57) ABSTRACT

In an embodiment, a microcode unit for a processor is contemplated. The microcode unit comprises a microcode memory storing a plurality of microcode routines executable by the processor, wherein each microcode routine comprises two or more microcode operations. Coupled to the microcode memory, the sequence control unit is configured to control reading microcode operations from the microcode memory to be issued for execution by the processor. The sequence control unit is configured to stall issuance of microcode operations forming a body of a loop in a first routine of the plurality of microcode routines until a loop counter value that indicates a number of iterations of the loop is received by the sequence control unit.

20 Claims, 7 Drawing Sheets

|  | Set Count | I0 | I1 | WFC | - |
|---|---|---|---|---|---|
|  | I2 | I3 | I4 | None | - |
|  | I5 | I6 | I7 | BIf0 | Exit |
|  | I8 | I9 | I10 | None | - |
| Loop | I11 | I12 | I13 | BIfGT1 | Loop |
|  | I14 | I15 | I16 | None | - |
| Exit | I17 | I18 | I19 |  |  |

PRECISE COUNTER HARDWARE FOR MICROCODE LOOPS

BACKGROUND

1. Field of the Invention

This invention is related to the field of processors and, more particularly, to micro coding in processors.

2. Description of the Related Art

Processor designers often design their products in accordance with the x86 instruction set architecture (ISA) in order to take advantage of its widespread acceptance in the computer industry. Because the x86 ISA is pervasive, many computer programs are written in accordance with the architecture. X86 compatible processors may execute these computer programs, thereby becoming more attractive to computer system designers who desire x86-capable computer systems. Such computer systems are often well received within the industry due to the wide range of available computer programs.

Certain instructions within the x86 instruction set are quite complex, specifying multiple operations to be performed. For example, the PUSHA instruction specifies that each of the x86 registers be pushed onto a stack defined by the value in the ESP register. The corresponding operations are a store operation for each register, and decrements of the ESP register between each store operation to generate the address for the next store operation. Often, complex instructions are classified as microcode instructions (or MROM instructions, for microcode read-only memory). MROM instructions are transmitted to a microcode unit, or MROM unit, within the processor. The MROM instruction is implemented as a microcode routine or routines stored in a memory within the MROM unit, where the microcode routine comprises simpler microcode operations for execution by the processor. The microcode routines are typically stored in a read-only memory (ROM) within the microcode unit. The microcode unit determines an address within the ROM at which the routine begins, and the microcode unit transfers operations out of the ROM beginning at that address. The microcode routines can include loops, one or more iterations of which can be executed to complete an MROM instruction.

Conversely, less complex instructions are decoded by hardware decode units within the processor, without intervention by the microcode unit. The terms "directly-decoded instruction" and "fastpath instruction" will be used herein to refer to instructions which are decoded and executed by the processor without the aid of a microcode unit. As opposed to MROM instructions which are reduced to simpler instructions which may be handled by the processor, fastpath instructions are decoded and executed via hardware decode and functional units included within the processor. While the x86 ISA is used as an example of an ISA that may be implemented using at least some microcoding, other ISAs may be implemented using micro coding as well.

SUMMARY

In an embodiment, a microcode unit for a processor is contemplated. The microcode unit comprises a microcode memory storing a plurality of microcode routines executable by the processor, wherein each microcode routine comprises two or more microcode operations. Coupled to the microcode memory, the sequence control unit is configured to control reading microcode operations from the microcode memory to be issued for execution by the processor. The sequence control unit is configured to stall issuance of microcode operations forming a body of a loop in a first routine of the plurality of microcode routines until a loop counter value that indicates a number of iterations of the loop is received by the sequence control unit.

In one embodiment, a processor comprises a functional unit configured to execute a first microcode operation to provide a loop counter value to a microcode unit; and the microcode unit coupled to receive the loop counter value from the functional unit. A microcode routine comprising the first microcode operation also comprises a plurality of microcode operations forming a body of a loop. The loop counter value specifies a number of iterations of the loop, and the microcode unit is configured to stall issuance of the plurality of microcode operations until the loop counter value is provided by the functional unit.

In some embodiments, a method comprises stalling issuance of one or more microcode operations forming a body of a loop in a microcode routine at a microcode unit; receiving a loop counter value in the microcode unit indicating a number of iterations of the loop that are to be executed; and issuing the microcode operations forming the body of the loop responsive to the receiving.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Processor Overview

Figure 1:
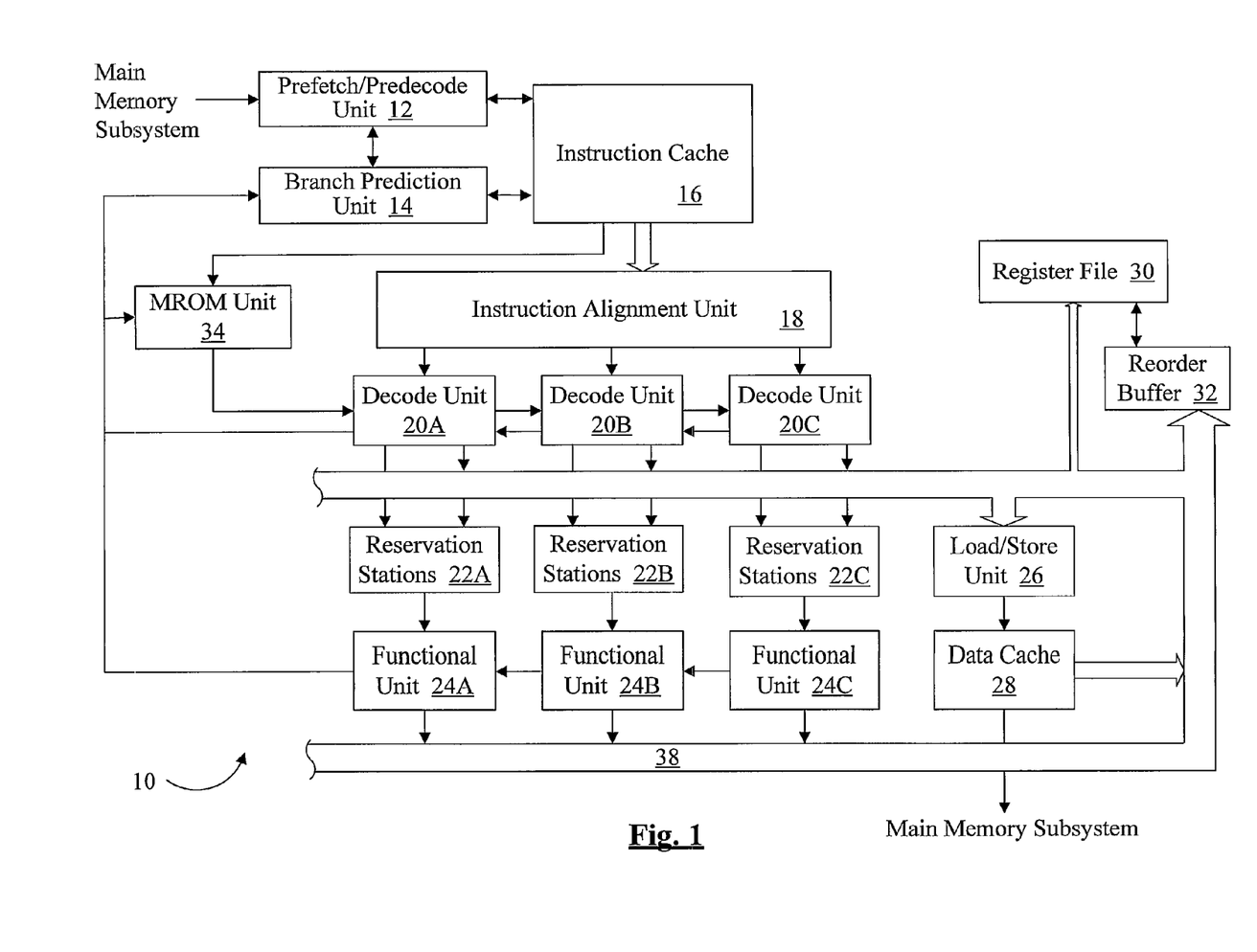
FIG. 1 is a block diagram of one embodiment of a processor.

Turning now to FIG. 1, a block diagram of one embodiment of a processor 10 is shown. In the illustrated embodiment, the processor 10 includes a prefetch/predecode unit 12, a branch prediction unit 14, an instruction cache 16, an instruction alignment unit 18, a plurality of decode units 20A-20C, a plurality of reservation stations 22A-22C, a plurality of functional units 24A-24C, a load/store unit 26, a data cache 28, a register file 30, a reorder buffer 32, and an MROM unit 34. Blocks referred to herein with a reference number followed by a letter will be collectively referred to by the reference number alone. For example, decode units 20A-20C will be collectively referred to as decode units 20.

The prefetch/predecode unit 12 is coupled to receive instructions from a main memory subsystem (not shown), and is further coupled to the instruction cache 16 and the branch prediction unit 14. Similarly, the branch prediction unit 14 is coupled to the instruction cache 16. Still further, the branch prediction unit 14 is coupled to the decode units 20 and the functional units 24. The instruction cache 16 is further coupled to the MROM unit 34 and the instruction alignment unit 18. The instruction alignment unit 18 is in turn coupled to the decode units 20. Each decode unit 20A-20C is coupled to the load/store unit 26 and to respective reservation stations 22A-22C. The reservation stations 22A-22C are further coupled to respective functional units 24A-24C. Additionally, the decode units 20 and the reservation stations 22 are coupled to the register file 30 and the reorder buffer 32. The functional units 24 are coupled to the load/store unit 26, the register file 30, and the reorder buffer 32 as well. The data cache 28 is coupled to the load/store unit 26 and to the main memory subsystem. Finally, the MROM unit 34 is coupled to the decode units 20 and at least one of the functional units 24.

Generally speaking, the MROM unit 34 decodes MROM instructions and dispatches a plurality of microcode operations into the instruction processing pipeline. The plurality of microcode operations, when executed, effectuate the architecturally defined function(s) of the MROM instruction. The microcode operations may include fastpath instructions, and may also include specially designed operations that may be used by the microcode routines but that are not part of the ISA implemented by the processor 10. In general, a microcode operation may be any operation that a functional unit is configured to execute. The microcode operations, collectively, may be referred to as a microcode routine or microcode sequence. Some microcode routines may contain microcode loops that repetitively execute the same operations for a specified number of iterations. The number of iterations may be specified by a loop counter value. Prior to entering the loop, in one embodiment, a microcode operation (referred to herein as "set loop count") may be dispatched to obtain the loop count (e.g. from a processor register). The MROM unit 34 may issue the set loop count operation, and then may stall at least some subsequent operations until the loop counter value is returned. For example, the loop counter value may be returned by a functional unit 24A-24C that executes the set loop count operation. The stalled operations may include the operations that form the body of the loop (that is, the operations which are executed in each iteration of the loop). Accordingly, the loop count may be known before the body of the loop is issued for the first time, and a precise number of iterations may be issued. That is, in one embodiment, no prediction or speculative issuance from the MROM unit 34 of loop iterations may be performed. Thus, the MROM unit 34 need not implement hardware to cancel speculatively issued iterations, in one embodiment. Of course, the MROM instruction that corresponds to the microcode routine may be speculative and thus may be cancelled, but that operation may be handled by other parts of the processor 10 (e.g. the reorder buffer 32 and reservation stations 22) similar to other speculative instructions.

The instruction cache 16 is a high speed cache memory provided to store instructions. Instructions are fetched from the instruction cache 16 and dispatched to the decode units 20. It is noted that instruction cache 16 may be implemented as a fully associative, set associative, or direct mapped configuration in various embodiments.

Instructions are fetched from main memory and stored into the instruction cache 16 by the prefetch/predecode unit 12. Instructions may be prefetched prior to the instruction cache 16 recording a miss for the instructions in accordance with a prefetch scheme. A variety of prefetch schemes may be employed by the prefetch/predecode unit 12. As the prefetch/predecode unit 12 transfers instructions from main memory to instruction cache 16, prefetch/predecode unit 12 may generate predecode data identifying instructions in the instructions bytes. In one embodiment, three predecode bits for each instruction byte may be generated: a start bit, an end bit, and a functional bit. The predecode bits form tags indicative of the boundaries of each instruction. The predecode tags may also convey additional information such as whether a given instruction is directly-decoded (fastpath) or MROM. Still further, the prefetch/predecode unit 12 may be configured to detect branch instructions and to store branch prediction information corresponding to the branch instructions into the branch prediction unit 14.

The processor 10 employs branch prediction in order to speculatively fetch instructions subsequent to conditional branch instructions. The branch prediction unit 14 is included to perform branch prediction operations. In one embodiment, up to two branch target addresses are stored with respect to each cache line in the instruction cache 16. The prefetch/predecode unit 12 determines initial branch targets when a particular line is predecoded. Subsequent updates to the branch targets corresponding to a cache line may occur due to the execution of instructions within the cache line. The instruction cache 16 provides an indication of the instruction address being fetched, so that the branch prediction unit 14 may determine which branch target addresses to select for forming a branch prediction. The decode units 20 and the functional units 24 provide update information to the branch prediction unit 14. A variety of suitable branch prediction algorithms may be employed by branch prediction unit 14.

Instructions fetched from the instruction cache 16 are conveyed to the instruction alignment unit 18. As instructions are fetched from instruction cache 16, the corresponding predecode data is scanned to provide information to the instruction alignment unit 18 (and to the MROM unit 34) regarding the instructions being fetched. The instruction alignment unit 18 utilizes the scanning data to align an instruction to each of decode units 20. In one embodiment, the instruction alignment unit 18 aligns instructions from three sets of eight instruction bytes to the decode units 20. The decode unit 20A receives an instruction which is prior to instructions concurrently received by the decode units 20B and 20C (in program order). Similarly, the decode unit 20B receives an instruction which is prior to the instruction concurrently received by the decode unit 20C in program order. As used herein, the term "program order" refers to the order of the instruction as coded in the original sequence in memory (including any branches as predicted by the branch prediction unit 14). Additionally, the term "issue" or the term "dispatch" may be used to refer to conveyance of an operation that is to be executed from one unit to another.

In one embodiment, the instruction alignment unit 18 includes an instruction queue configured to store instruction bytes. An instruction scanning unit within the instruction cache 16 may separate the fetched instructions into instruction blocks, and may identify up to a predefined maximum number of instructions within each instruction block. Instruction identification information for each of the identified instructions is conveyed to the instruction alignment unit 18 and is stored in the instruction queue. In one embodiment, the predefined number of instruction bytes comprises eight instruction bytes stored in contiguous main memory storage locations. The eight instruction bytes are aligned to an eight byte boundary (i.e. the least significant three bits of the address of the first of the contiguous bytes are zero).

The decode units 20 are configured to decode instructions received from the instruction alignment unit 18. Register operand information may be detected and routed to the register file 30 and the reorder buffer 32. Speculative register values and/or tags may be provided to the corresponding reservation station 22. Additionally, if the instructions require one or more memory operations to be performed, the decode units 20 may dispatch the memory operations to the load/store unit 26. Each instruction is decoded into decoded instructions for the functional units 24, and these decoded instructions are dispatched to the reservation stations 22 along with operand address information and displacement or immediate data which may be included with the instruction.

The processor 10 supports out of order execution, and thus employs the reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to the register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that, in other embodiments, a centralized scheduler may be implemented rather than the reservation stations. In other embodiments, register renaming across a larger set of physical registers (with a map of logical registers to physical registers) may be used instead of a reorder buffer.

In one embodiment, each reservation station 22 is capable of holding instruction information (i.e., decoded instructions as well as operand values, operand tags and/or immediate data) for multiple pending instructions awaiting issue to the corresponding functional unit. It is noted that for the embodiment of FIG. 1, each reservation station 22 is associated with a dedicated functional unit 24. Accordingly, three dedicated "issue positions" are formed by the reservation stations 22 and the functional units 24. In other words, issue position 0 is formed by the reservation station 22A and the functional unit 24A. Instructions aligned and dispatched to the reservation station 22A are executed by the functional unit 24A. Similarly, issue position 1 is formed by the reservation station 22B and the functional unit 24B; and issue position 2 is formed by the reservation station 22C and the functional unit 24C. As used herein, the term "issue position" refers to logic circuitry configured to receive an instruction and to execute that instruction. Once the instruction enters the issue position, it remains in that issue position until the execution of the instruction is completed. More or fewer issue positions (and thus more or fewer functional units) may be implemented in other embodiments.

The register file 30 may comprises storage locations for each of the registers specified by the ISA implemented by the processor 10. Additional storage locations may also be included within the register file 30 for use by the MROM unit 34. The reorder buffer 32 contains temporary storage locations for results which change the contents of these registers to thereby allow out of order execution. A temporary storage location of the reorder buffer 32 is reserved for each instruction which, upon decode, is determined to modify the contents of one of the registers. Therefore, at various points during execution of a particular program, the reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If there is no location reserved for a required register in the reorder buffer 32, the value is taken from the register file 30. In one particular embodiment, the reorder buffer 32 is configured to store and manipulate concurrently decoded instructions as a unit. This configuration will be referred to herein as "line-oriented".

As noted earlier, the reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A-22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A-24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. It is noted that a floating point unit (not shown) may also be employed to accommodate floating point operations. The floating point unit may be operated similar to load/store unit 26 in that any of the decode units 20 may dispatch instructions to the floating point unit. Additionally, the functional units 24 may be configured to perform address generation for load and store memory operations performed by the load/store unit 26.

Results produced by the functional units 24 are sent to the reorder buffer 32 if a register value is being updated, and to the load/store unit 26 if the contents of a memory location are changed. If the result is to be stored in a register, the reorder buffer 32 stores the result in the location reserved for the value of the register when the instruction was decoded. A plurality of result buses 38 are included for forwarding of results from the functional units 24 and the load/store unit 26. The result buses 38 convey the result generated, as well as the reorder buffer tag identifying the instruction being executed.

The load/store unit 26 provides an interface between the functional units 24 and the data cache 28. In one embodiment, the load/store unit 26 is configured with a load/store buffer (or buffers). The decode units 20 arbitrate for access to the load/store unit 26. The load/store unit 26 also performs dependency checking for load memory operations against pending store memory operations to ensure that data coherency is maintained. Additionally, the load/store unit 26 may include a special register storage for special registers such as the segment registers and other registers related to the address translation mechanism defined by the x86 processor architecture.

The data cache 28 is a high speed cache memory provided to temporarily store data being transferred between the load/store unit 26 and the main memory subsystem. Similar to the instruction cache 16, the data cache 28 may be implemented in a variety of specific memory configurations, including a set associative configuration, direct mapped configuration, etc.

MROM Overview

Figure 2:
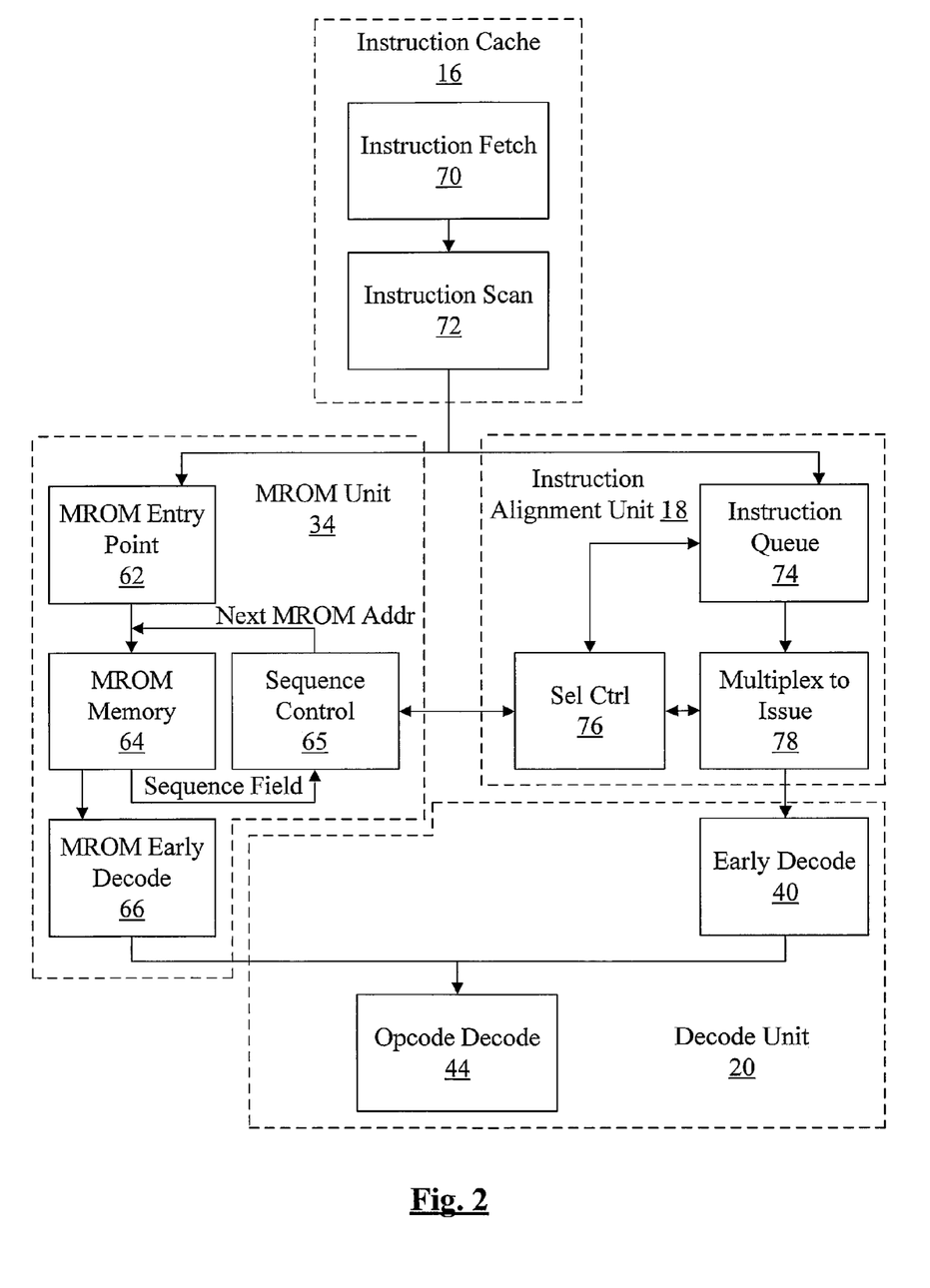
FIG. 2 is a block diagram of one embodiment of a portion of the processor shown in FIG. 1.

Turning now to FIG. 2, a block diagram depicting portions of one embodiment of the instruction cache 16, the instruction alignment unit 18, the decode unit 20 and the MROM unit 34 is shown. The decode unit 20 may be illustrative of any of the decode units 20A-20C. That is, each decode unit 20A-20C may be similar to the illustrated decode unit 20. Embodiments of the processor 10 may employ other elements in addition to those shown in FIG. 2. The instruction cache 16 includes an instruction fetch unit 70 and an instruction scan unit 72. The MROM unit 34 includes an MROM entry point generator 62, an MROM memory 64, a sequence control unit 65, and an MROM early decode unit 66. The instruction alignment unit 18 includes an instruction queue 74, a selection control unit 76, and a multiplex to issue unit 78. The decode unit 20 includes an early decode unit 40 and an opcode decode 44.

The instruction fetch unit 70 fetches instructions from instruction cache storage (not shown) using addresses provided by the branch prediction unit 14. The instruction fetch unit 70 conveys the fetched instructions to the instruction scan unit 72. The instruction scan unit 72 scans the predecode data corresponding to the fetched instructions, and conveys the instructions and instruction identification information to the instruction queue 74. The instruction scan unit 72 also detects MROM instructions. MROM instructions detected by the instruction scan unit 72 are conveyed to the MROM entry point generator 62. In one embodiment, at most one MROM instruction per clock cycle may be accepted by the MROM unit 34. Therefore, if a second MROM instruction is detected within a set of instruction bytes being scanned during a particular clock cycle, instruction blocks including the second MROM instruction and subsequent instructions in the program order may be stalled until a subsequent clock cycle. For example, the second MROM instruction and subsequent instructions may be stalled until the first MROM instruction is completed by the MROM unit 34 (i.e. all instructions in the microcode routine have been issued).

The flow of instructions through the instruction alignment unit 18 and the decode unit 20 may generally be as highlighted above. Instructions in the instruction queue 76 may be selected through the multiplex to issue unit 78 by the selection control unit 76. The multiplex to issue unit 78 may also include a queue to store the selected instructions to be conveyed to the decode units 20. The sequence control unit 65 may communicate with the selection control unit 76 to synchronize the issuance of microcode operations for a given MROM instruction. That is, the given MROM instruction may become the oldest instruction remaining to be issued by the instruction alignment unit 76, and then the MROM unit 34 may insert microcode operations from the corresponding microcode routine. The instruction alignment unit 18 may stall subsequent instructions until the sequence control unit 65 indicates that the microcode routine has been issued, and subsequent instructions may be transmitted. The MROM instruction itself may not be transmitted by the instruction alignment unit 18, although related information such as the PC of the MROM instruction may be provided with the microcode operations.

An MROM instruction, in addition to flowing to the instruction queue 72, is provided to the MROM unit 34. The MROM entry point generator 62 calculates the location, or microaddress (MROM Addr), in the MROM memory 64 of the start of the microcode routine that corresponds to the received MROM instruction. In one embodiment, the entry point MROM Addr is calculated from the opcode, the ModR/M bytes, and the prefix byte of the MROM instruction.

The MROM memory 64 is a storage device capable of storing microcode operations. In one embodiment, the MROM memory 64 is a read-only memory (ROM). In other embodiments, other storage devices can be used to implement the MROM memory 64. For example, writeable memory may be used along with a protected mechanism for loading the contents of the MROM memory 64 from an external source during power up of the processor 10. The MROM memory 64 uses the entry point microaddress generated by MROM entry point generator 62 to access the first microcode entry of a microcode routine. In one embodiment, the MROM memory 64 stores multiple microcode operations in each microcode entry of the MROM memory 64. In one specific embodiment, each microcode entry contains a number of microcode operations equal to the number of functional units in the processor. The sequence control unit 65 may determine the location of the next entry of microcode to be accessed (next MROM Addr) The next entry of microcode may be the sequential entry in the MROM memory 64. Alternatively, the next entry of microcode may be a different entry. For example, a loop may include one or more entries of microcode. When the end of the loop is reached, if another loop iteration is to be executed, the sequence control unit 65 may provide the microaddress of the first entry in the loop as the next entry to access from the MROM memory 64. The next MROM Address may be generated responsive to a sequence field provided with each entry in the MROM memory 64. Thus, as shown, the microcode operations in the entry may be supplied to the MROM early decode unit 66, and the sequence field from the entry may be supplied to the sequence control unit 65. In one embodiment, the sequence field from a given entry may determine the next MROM Addr after the next entry has been read and dispatched. Viewed in another way, the next sequential entry in the MROM memory 65 after a sequence field that causes a non-sequential address to be selected will also be inserted, similar to a branch delay slot in some ISAs.

In one embodiment, in addition to specifying the next MROM Addr, the sequence control 65 also detects the exit of the microcode routine. If the exit is detected, the sequence control unit 65 may select a new entry point of the next MROM instruction (if any) provided by the MROM entry point generator 62, as the next MROM Addr. If there is not a next MROM instruction, the MROM unit 34 may be idle. Additionally, the sequence control unit 65 may signal the selection control unit 76 that the MROM instruction is completed.

The MROM early decode unit 66 may format the instructions similar to the formatting of the early decode unit 40. The formatted instructions are conveyed to the opcode decode unit 44, which selects either the microcode instructions conveyed by the MROM early decode unit 66 or fastpath instructions conveyed by the early decode unit 40. In one embodiment implementing the x86 ISA, the early decode units 66 may perform the following operations: (i) merge the prefix bytes of the instruction into an encoded prefix byte; (ii) decode unconditional branch instructions (which may include the unconditional jump, the CALL, and the RETURN) which were not detected during branch prediction; (iii) decode source and destination flags; (iv) decode the source and destination operands which are register operands and generate operand size information; and (v) determine the displacement and/or immediate size so that displacement and immediate data may be routed to the opcode decode unit. The opcode decode units 44 are configured to decode the opcode of the instruction. In other embodiments, the decode unit 20 may decode microcode operations (performing the early decode functions as well) and the MROM memory 64 may convey microcode operations directly to the decode unit 20.

Generally speaking, a sequence control field may be a field that contains data used to control the access of data within an MROM storage device. In one embodiment, this field contains data indicating whether the entry is the last entry of the microcode routine, conditions for conditional microbranches such as loop branches (although there may not be an actual branch instruction in the microcode operations dispatched for loops, since the loop counter value is obtained and a precise number of loop iterations are transmitted), and other information used for sequence control of the MROM memory 64.

It is noted that, while the above embodiment detects MROM instructions by scanning predecode data, other embodiments may detect MROM instructions in the decode unit and may transmit the MROM instruction to the MROM unit 34 at decode. The microcode operations may be inserted below the decode units, in such embodiments, or the microcode unit may provide the microcode operations to the decode unit(s) for decoding. Furthermore, other embodiments may issue one microcode operation at a time, or differing numbers of microcode operations than functional units, in various embodiments.

Loop Management in the Microcode Unit

As mentioned previously, the MROM unit 34 may issue the set loop count operation and may stall subsequent issuance of microcode operations until the loop counter value is returned to the MROM unit 34. Specifically, at least the microcode operations that form the body of the loop (that is, those microcode operations that are executed for each iteration of the loop) may be stalled. In one embodiment, the effect of a sequence field is delayed by one microcode entry. Accordingly, the entry that follows the entry including the set loop count operation may be filled with non-loop body instructions or noops, so that the loop body is not issued until the loop counter value is returned.

The sequence field corresponding to the termination of the loop (e.g. the sequence field from the second to last entry of the loop, in the above embodiment) may test the value of the loop count to determine when to exit the loop body. Additionally, the test may include decrementing the count. In one embodiment, the loop counter value is tested before the decrement occurs. Other embodiments may test the loop counter value after the decrement occurs. Furthermore, any modification of the loop counter value may be performed in various embodiments. Additionally, the MROM unit 34 may support testing the loop counter value without decrementing the value. Such tests may be used, e.g., before the start of the loop body to handle special cases (e.g. a loop counter value of zero or one).

Figure 3:
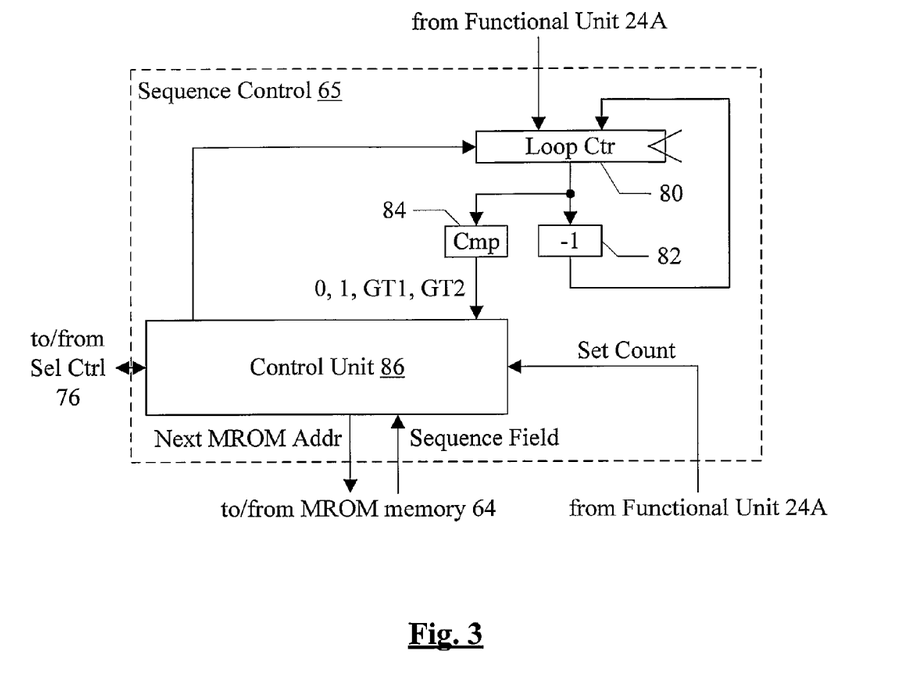
FIG. 3 is a block diagram of one embodiment of a sequence control unit shown in FIG. 2.

Turning now to FIG. 3, a block diagram of one embodiment of the sequence control unit 65 is shown. In the embodiment illustrated in FIG. 3, the sequence control unit 65 includes a loop counter register 80, a decrementer 82, a compare circuit 84, and a control unit 86. The control unit 86 is coupled to communicate with the selection control unit 76, to provide the next MROM Addr to the MROM memory 64 and to receive the sequence field from the MROM memory 64, and to receive a set count signal from the functional unit 24A. The control unit 86 is coupled to control the register 80 and to receive comparison outputs from the compare circuit 84. The compare circuit 84 and the decrementer 82 are coupled to receive the contents of the register 80, and the decrementer 82 is coupled to the input of the register 80. The register 80 is also coupled to receive the loop count from the functional unit 24A.

The control unit 86 may receive a sequence field indicating that the set loop count operation is being dispatched, and thus that loop body operations will be occurring in the microcode routine. The control unit 86 may stall issuance of subsequent microcode operations in response to the sequence field. The stall may be implemented in various fashions. For example, the control unit 86 may not generate the next MROM Addr for the MROM memory 64, and thus no new valid instructions may be read from the MROM memory 64. Alternatively or in addition, the control unit 86 may assert a stall signal to the MROM early decode unit 66, indicating that no microcode operations should be transmitted.

The set loop count operation may be executed by the functional unit 24A, and the functional unit 24A may provide the loop counter value to the register 80. The functional unit 24A may also signal that the loop counter value is being provided (set count in FIG. 3). The control unit 86 may cause the register 80 to load the value, and may cease stalling the issuance of the loop body operations.

Other encodings of the sequence field permit the value of the loop counter to be tested, and sometimes decremented. If a sequence field indicates a test of the loop counter value and decrement, the control unit 86 may cause the register 80 to load the output of the decrementer 82. Otherwise, the control unit 86 may cause the register 80 to hold its value constant.

The comparator circuit 80 outputs signals indicating the comparison results for each test of the loop counter value that is supported in the present embodiment. Comparison signal outputs indicating a loop counter value of 0, 1, greater than (GT) 1, and GT2 are provided. In one embodiment, testing the count value for 0 and 1 may be used for initial loop count testing, and does not result in a decrement of the loop counter value. Testing for greater than 1 and greater than 2 may be used for loop iterations (at the end of the loop body) and may include decrementing the loop count.

The register 80 may be implemented, in some embodiments, as a three input mux with the current value, the decremented value, and the value from the functional unit 24A as inputs. The control unit 86 may provide the mux select controls. Alternatively, a two input register 80 with a hold input may be implemented, or a two input mux and register with a hold input may be implemented.

In some embodiments, the sequence control unit 65 may provide for loop nesting by providing one or more additional loop counters that can be loaded with different loop count values. The tests for loop count value may specify which loop count is being tested, in such embodiments. Alternatively, loop nesting may be handled by storing loop count values in microcode temporary registers, and operations may be supported to move loop counts out of the loop counter register 80 to microcode temporary registers.

In the present embodiment, the set loop count operation is required to be transmitted to a particular functional unit (functional unit 24A). For example, in embodiments in which an entry includes up to a number of microcode operations equal to the number of issue positions, the set loop count operation may be in the first issue position (which is routed to the functional unit 24A). Thus, the sequence control unit 65 need only be coupled to receive the loop counter value from the functional unit 24A. Other embodiments may permit the set loop count operation in any issue position, and the sequence control unit 65 may be coupled to receive loop counter values and set count signals from each functional unit.

Figure 4:
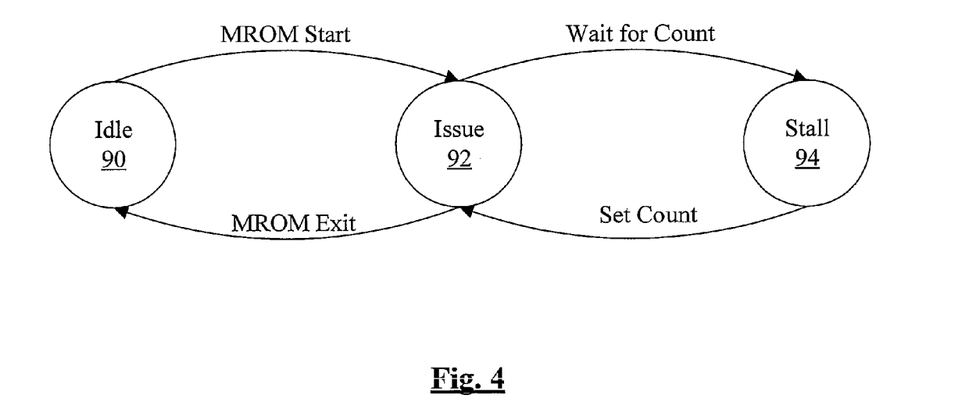
FIG. 4 is a block diagram of one embodiment of a state machine that may be implemented in one embodiment of the sequence control unit.

Turning next to FIG. 4, a block diagram of one embodiment of a state machine that may be implemented for loop management in the control unit 86 is shown. Transitions between the states are shown with arrows. If a transition from a state is not made, then the state machine remains in that state, for the embodiment illustrated in FIG. 4.

The state machine includes an idle state 90, an issue state 92, and a stall state 94. The idle state 90 may correspond to the MROM unit 34 being idle (not currently attempting to issue operations from a microcode routine). The issue state 92 may correspond to the MROM unit 34 issuing operations, and the stall state 94 may correspond to the MROM unit 34 stalling issuance of loop body operations while awaiting the loop counter value.

The state machine may transition from the idle state 90 to the issue state 92 responsive to an MROM instruction being provided to the MROM unit 34 ("MROM start" arrow in FIG. 4). The MROM entry point generator 62 may provide the entry point address, and the control unit 86 may receive the first sequence field and may begin generating next MROM Addrs for the MROM memory 64. If a sequence field indicates wait for count (that is, the set loop count operation is issued, "Wait for Count" arrow in FIG. 4), the state machine transitions from the issue state 92 to the stall state 94. In the stall state 94, if the set count signal is asserted from the functional unit 24A ("Set Count" arrow in FIG. 4), the state machine transitions from the stall state 94 to the issue state 92. It is noted that a given microcode routine may have more than one loop, and thus may have more than one transition from the issue state 92 to the stall state 94 and back. If the sequence field indicates that the microcode routine is exiting ("MROM exit" arrow in FIG. 4), the state machine may transition from the issue state 92 to the idle state 90.

Figure 5:
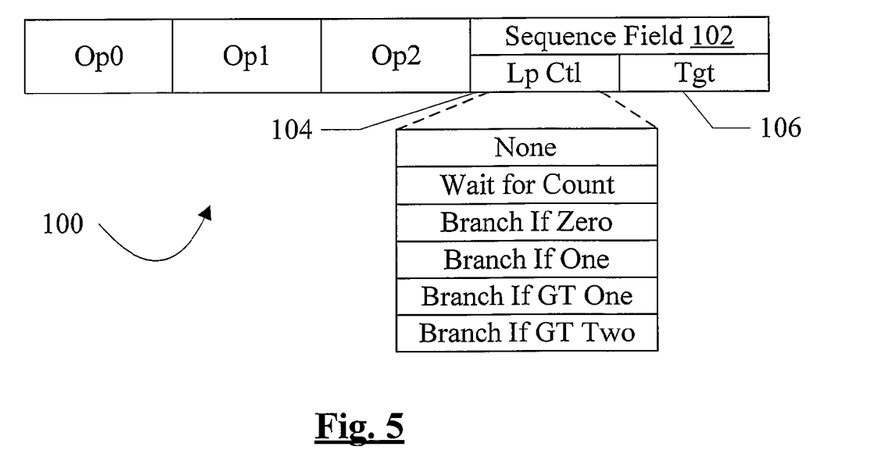
FIG. 5 is a block diagram of one embodiment of a microcode memory entry.

Turning now to FIG. 5, a block diagram of one embodiment of an entry 100 in the MROM memory 64 is shown. In the illustrated embodiment, the MROM entry 64 includes a plurality of microcode operations (Op0 to Op2 in FIG. 5) and a sequence field 102. The sequence field 102 includes a loop control field (Lp Ctl) 104 and a target (Tgt) field 106. The sequence field 102 may also include various other control values (not shown) used for other purposes. The target field 106 may be a target address if the loop control field encoding (and the current loop counter value) cause the loop to be iterated. That is, the target address is the beginning of the loop. The target address may be relative or absolute, in various embodiments.

The loop control field 104 may have various encodings, the meanings of which are illustrated in exploded view in FIG. 5. The actually encoding assignments may be set in any desired fashion. In one embodiment, the loop control field 104 may be a general control field with encodings for loop control as well as various other encodings. In the exploded view, the loop control field 104 may have values indicating none, wait for count, branch if zero, branch if one, branch if greater than one, and branch if greater than two. If the loop control field 104 is coded to "none", the next sequential MROM address may be generated. The "none" encoding may be used for entries that are part of the body of the loop. The loop control field 104 is coded to "wait for count" to indicate that the set loop count operation is being issued, and the sequence control unit 65 is to stall. The "branch if 0/1" codings may be used to test for special cases of the loop count before entering the loop. For example, if the loop count is zero, then no iterations of the loop are performed. The "branch if 0" coding may be used to branch around the loop body to the microcode operations that are after the loop exit. The "branch if 1" coding may be used if a single iteration of the loop is handled differently, or if the last iteration is handled differently (since the first iteration is the last if the loop count is 1). Since the "branch if 0/1" tests may be used for special case checking, these codings may not result in a decrement of the loop count. On the other hand, the "branch if greater than 2/1" may be used at the end of the loop body, and may include decrementing the counter. The "branch if greater than 1" coding may be used for a normal loop exit (since the decrement when the branch falls through sequential would reduce the loop counter to zero). That is, the branch if greater than 1 coding may be used with a target address of the beginning of the loop body, causing another iteration to be issued if the branch is taken (or "greater than 1" is true). The "branch if greater than 2" coding may be used if the last iteration has some different handling, to exit the loop body to perform the last iteration.

It is noted that, in one embodiment, the loop body need not include explicit compare and branch operations to test the loop counter value and branch to the beginning of the loop. Thus, the operations executed by the functional units to implement the body of the loop may be a string of sequential non-branch operations (unless branches are used for another reason within the loop body).

There may be other special case tests and/or exit conditions that are desired, and additional codings of the loop control field 104 may be defined to handle such cases. Additionally, any subset of the listed codings and other codings may be used.

Figure 6:
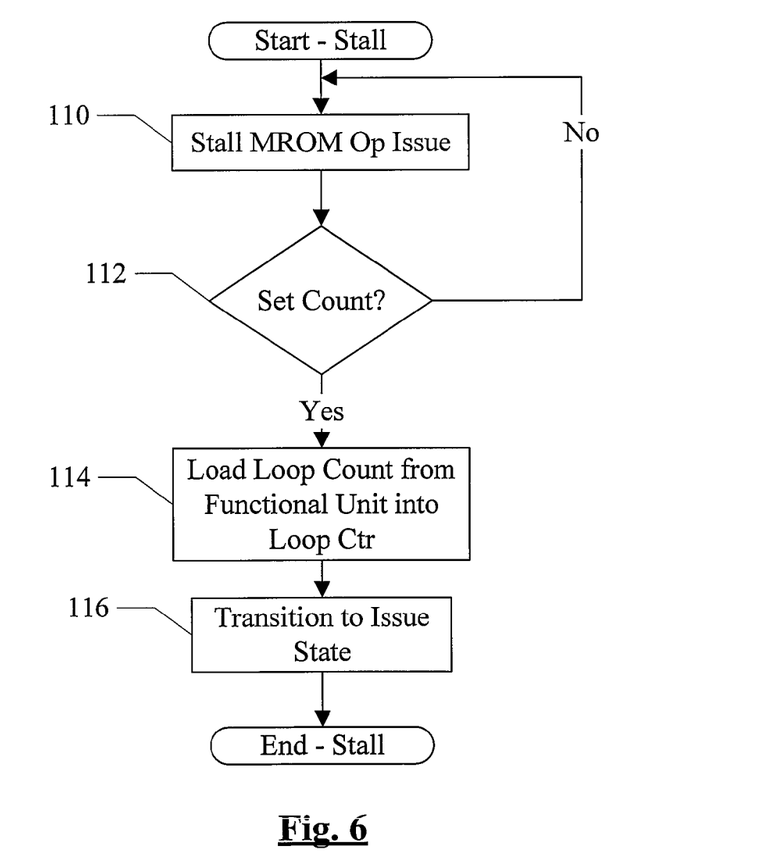
FIG. 6 is a flowchart illustrating operation of one embodiment of a control unit shown in FIG. 3 in a stall state shown in FIG. 4.

Turning next to FIG. 6, a flowchart is shown illustrating operation of one embodiment of the MROM unit 34, and more specifically the sequence control unit 65, in one embodiment, and even more specifically the control unit 86, in one embodiment, in the stall state 94. While the blocks are shown in a particular order for ease of understanding, other orders may be used. Blocks may be performed in parallel in combinatorial logic within the MROM unit 34/sequence control unit 65/control unit 86. Blocks, combinations of blocks, and/or the flowchart as a whole may be pipelined over multiple clock cycles.

The MROM unit 34 may stall microcode operation issue (block 110). If the set count signal is not asserted by the functional unit 24A (decision block 112, "no" leg), the MROM unit 34 may continue stalling issue. If the set count signal is asserted (decision block 112, "yes" leg), the MROM unit 34 may load the loop counter value provide by the functional unit 24A into the loop counter register 80 (block 114), and may transition to the issue state (block 116).

Figure 7:
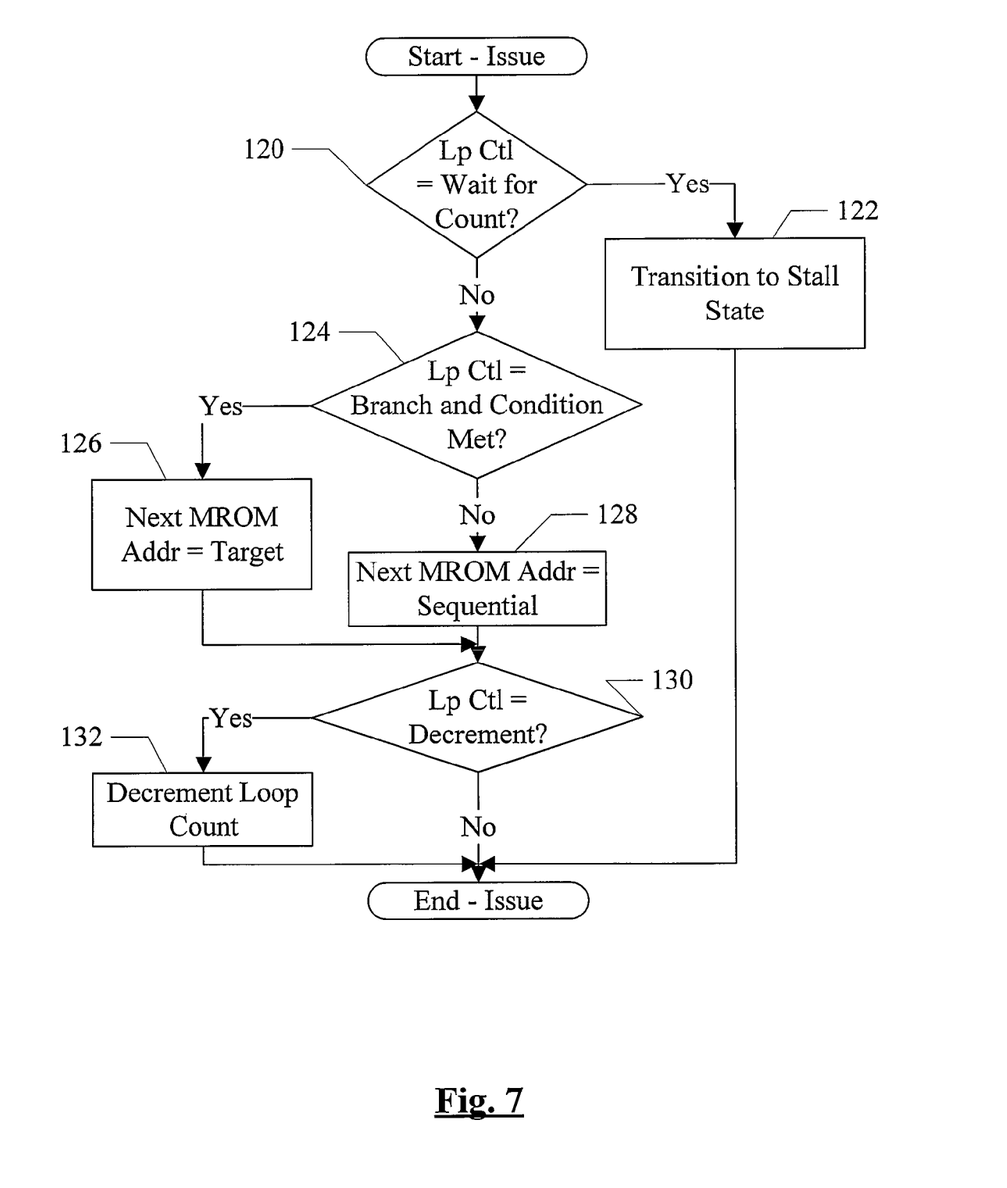
FIG. 7 is a flowchart illustrating operation of one embodiment of a control unit shown in FIG. 3 in a dispatch state shown in FIG. 4.

Turning now to FIG. 7, a flowchart is shown illustrating operation of one embodiment of the MROM unit 34, and more specifically the sequence control unit 65, in one embodiment, and even more specifically the control unit 86, in one embodiment, for handling loops in the issue state 92. Other operation in the issue state 92 may be supported for other, non-loop control fields and operations. While the blocks are shown in a particular order for ease of understanding, other orders may be used. Blocks may be performed in parallel in combinatorial logic within the MROM unit 34/sequence control unit 65/control unit 86. Blocks, combinations of blocks, and/or the flowchart as a whole may be pipelined over multiple clock cycles.

The sequence control unit 86 may decode the loop control field 104 of the current sequence field 102. If the loop control field 104 indicates wait for count (decision block 120, "yes" leg), the sequence control unit 86 may transition to the stall state 94 (block 122). If the loop control field indicates a branch and the condition is met (decision block 124, "yes" leg), the next MROM Addr may be controlled by the target field 106 (block 126). For example, the next MROM Addr may equal the target field if the target is absolute, or may equal the sum of the target field and the current MROM Addr if the target is relative. On the other hand, if the loop control field does not indicate branch (e.g. it indicates none) or the condition is not met (e.g. one of 0, 1, GT1, or GT2 in the embodiment of FIG. 5) (decision block 124, "no" leg), the next MROM Addr may be sequential to the current MROM Addr (block 128). If the loop control field indicates that the loop counter is to be decremented (e.g. the GT tests, in this embodiment—decision block 130, "yes" leg), the control unit 86 may decrement the loop counter value (block 132). For example, in the illustrated embodiment, the control unit 86 may cause the register 80 to load the output of the decrementer 82.

Figure 8:
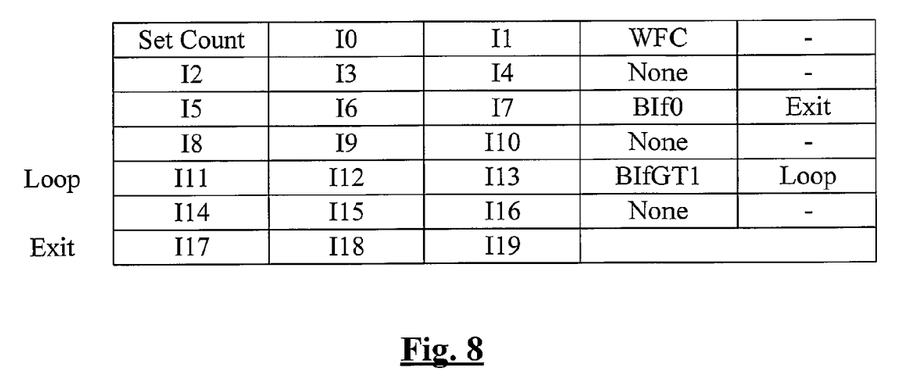
FIG. 8 is an example of a microcode routine including a loop.

Turning now to FIG. 8, an example of a microcode routine with loops is shown. In the example, a set of sequential entries from the MROM memory 64 are shown as rows, and the three operations are illustrated followed by the sequence field for each entry. The set loop count operation is shown as "set count", and other operations are shown as the capital letter "I" followed by a number. The loop control field is shown first, and then the target field, in the sequence field.

FIG. 8 is an example illustrating a preloop test for zero, followed by a "normal" loop exit when the loop counter is exhausted. The first entry in FIG. 8 includes the set count operation, as well as operations I0 and I1. Thus, the loop control field is set to wait for count (WFC in FIG. 8). There is no target address associate with the WFC coding in this embodiment. The next entry includes the operations I2, I3, and I4. These operations are not part of the loop body (or the preloop test), in the present embodiment, because of the delayed effect of the sequence field discussed previously. I2, I3, and I4 may perform other operations, or may be noops if there is no other operation to perform. Operations I2, I3, and I4 may be issued, and then the stall to wait for the loop counter value may take effect. It is note that, if the microcode routine includes operations before the set count operation, the loop control field with the WFC may be included in the previous sequence field and the operations I2, I3, and I4 would not be issued before the stall in that case.

In response to receiving the loop counter value, the MROM unit 34 may terminate the stall and issue operations I5, I6, and I7, and may process the sequence field indicating branch if 0 (BIf0 in FIG. 8). The corresponding target address is indicated by the Exit label, which is below the body of the loop. Thus, if the loop counter value is zero, the loop may be skipped. The operations I5, I6, and I7 (and the operations I8, I9, and I10) may be part of the preloop testing and preparation for the loop, and may be executed independent of the loop counter value.

The operations I11, I12, I13, I14, I15, and I16 form the body of the loop in this example. Thus, the sequence field in the entry with the operations I11, I12, and I13 indicates branch if greater than one (BIfGT1) to the Loop label, which is the entry including operations I11, I12, and I13. Accordingly, operations I11, I12, I13, I14, I15, and I16 may be iterated until the loop counter value has been decremented to one. When the loop counter value is 1, the loop exits (and the loop counter is decremented to zero) and operations I17, I18, and I19 are issued.

It is noted that, while the example of FIG. 8 illustrates a delayed sequence field effect (in which the next sequential entry is issued before the sequence field takes effect), other embodiments may not implement a delay. That is, a sequence field may take effect before the next sequential entry is issued.

It is noted that there need not be explicit compare and branch instructions to implement the loop. Instead, the compare and branch operations are handled view sequence field encodings and the counter hardware illustrated in FIG. 3. Other embodiments may not use the sequence fields, and may instead detect the set loop count operation and the branch to the beginning of the loop to determine when to stall awaiting the loop counter value and when to test the loop counter value (and decrement the loop counter value).

Computer System

Figure 9:
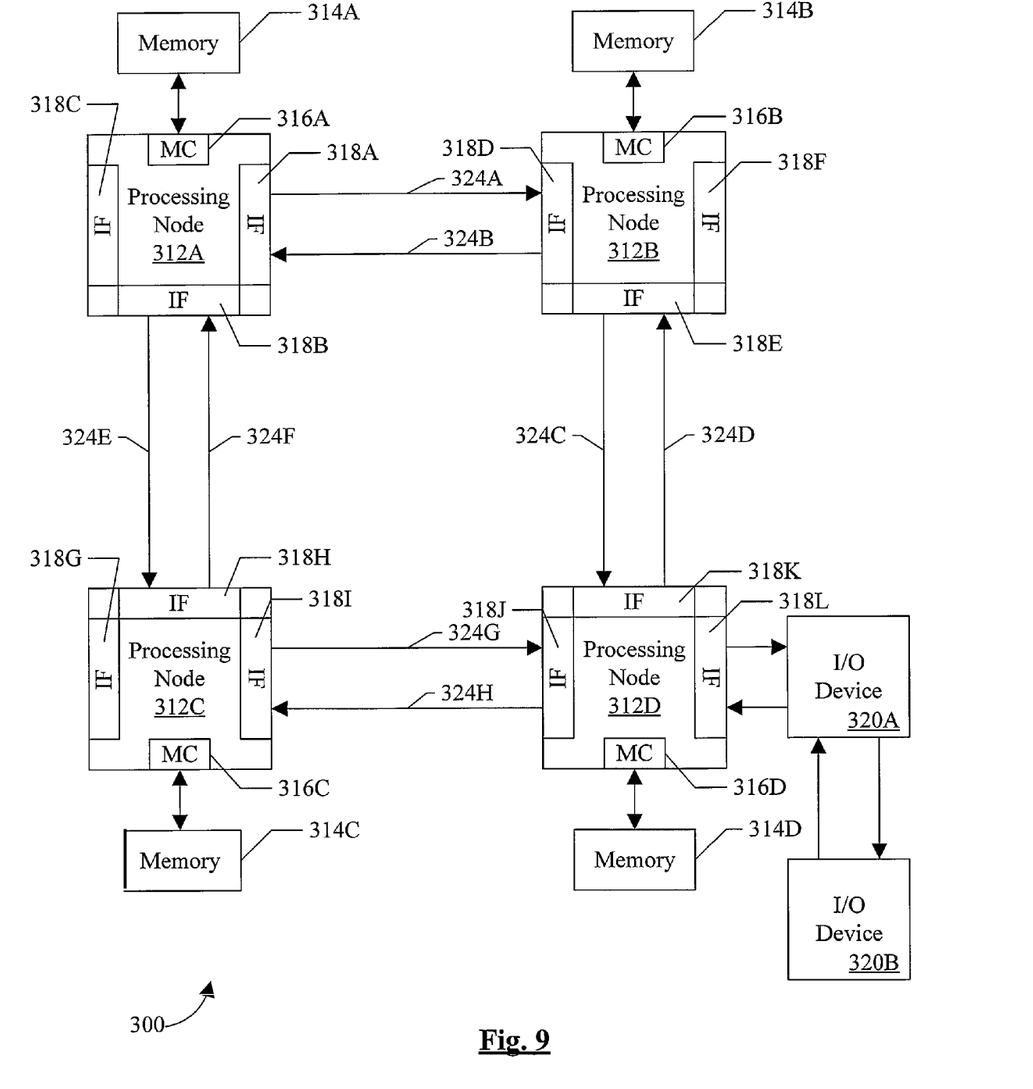
FIG. 9 is a block diagram of one embodiment of a computer system.

Turning now to FIG. 9, an embodiment of a computer system 300 is shown. In the embodiment of FIG. 9, computer system 300 includes several processing nodes 312A, 312B, 312C, and 312D. Each processing node is coupled to a respective memory 314A-314D via a memory controller 316A-316D included within each respective processing node 312A-312D. Additionally, processing nodes 312A-312D include interface logic used to communicate between the processing nodes 312A-312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A-320B in a daisy chain configuration) via interface logic 318L. Other processing nodes may communicate with other I/O devices in a similar fashion.

Processing nodes 312A-312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C-324H are used to transmit packets between other processing nodes as illustrated in FIG. 9. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the Peripheral Component Interconnect (PCI) bus or Industry Standard Architecture (ISA) bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 9. Any suitable routing algorithm may be used. Other embodiments of computer system 300 may include more or fewer processing nodes then the embodiment shown in FIG. 9.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A-312D, in addition to a memory controller and interface logic, may include one or more processors. Broadly speaking, a processing node comprises at least one processor and may optionally include a memory controller for communicating with a memory and other logic as desired. More particularly, each processing node 312A-312D may comprise one or more copies of processor 10 as shown in FIG. 1 (e.g. including various structural and operational details shown in FIGS. 2-8). One or more processors may comprise a chip multiprocessing (CMP) or chip multithreaded (CMT) integrated circuit in the processing node or forming the processing node, or the processing node may have any other desired internal structure.

Memories 314A-314D may comprise any suitable memory devices. For example, a memory 314A-314D may comprise one or more RAMBUS DRAMs (RDRAMs), synchronous DRAMs (SDRAMs), DDR SDRAM, static RAM, etc. The address space of computer system 300 is divided among memories 314A-314D. Each processing node 312A-312D may include a memory map used to determine which addresses are mapped to which memories 314A-314D, and hence to which processing node 312A-312D a memory request for a particular address should be routed. In one embodiment, the coherency point for an address within computer system 300 is the memory controller 316A-316D coupled to the memory storing bytes corresponding to the address. In other words, the memory controller 316A-316D is responsible for ensuring that each memory access to the corresponding memory 314A-314D occurs in a cache coherent fashion. Memory controllers 316A-316D may comprise control circuitry for interfacing to memories 314A-314D. Additionally, memory controllers 316A-316D may include request queues for queuing memory requests.

Generally, interface logic 318A-318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A-320B may be any suitable I/O devices. For example, I/O devices 320A-320B may include devices for communicating with another computer system to which the devices may be coupled (e.g. network interface cards or modems). Furthermore, I/O devices 320A-320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. Furthermore, any I/O device implemented as a card may also be implemented as circuitry on the main circuit board of the system 300 and/or software executed on a processing node. It is noted that the term "I/O device" and the term "peripheral device" are intended to be synonymous herein.

Furthermore, one or more processors 10 may be implemented in a more traditional personal computer (PC) structure including one or more interfaces of the processors to a bridge to one or more I/O interconnects and/or memory.

Numerous variations and modifications will become apparent to those skilled in the art once the above disclosure is fully appreciated. It is intended that the following claims be interpreted to embrace all such variations and modifications.

What is claimed is:

1. A method comprising:
    stalling issuance of one or more microcode operations forming a body of a loop in a microcode routine, the stalling performed at a microcode unit, wherein each read of a microcode memory storing the microcode routine supplies a plurality of microcode operations and a sequence field, and wherein the sequence field comprises a loop control field and a target field, and wherein the loop control field is coded to one of a plurality of encodings, and wherein the plurality of encodings include: a first encoding that indicates sequential execution, a second encoding that indicates the stalling, and a plurality of branch encodings; and wherein the plurality of branch encodings each specify a different loop count test to determine whether or not to branch to a beginning of the loop, and wherein the target field specifies an address of the beginning of the loop when the loop control field is coded to one of the plurality of branch encodings, and wherein the second encoding in a first sequence field associated with the microcode routine causes the stalling;
    receiving a loop counter value in the microcode unit indicating a number of iterations of the loop that are to be executed;
    terminating the stalling responsive to the receiving and issuing, from the microcode unit, the microcode operations forming the body of the loop responsive to the receiving; and
    determining whether to branch to the beginning of the loop for another iteration or to exit the loop responsive to the loop counter value and a second sequence field associated with the microcode operations forming the body, wherein the loop control field in the second sequence field is encoded to one of the plurality of branch encodings to indicate the loop counter test that determines whether or not to branch to the beginning of the loop, and wherein the microcode routine excludes a branch microcode operation to branch to the beginning of the loop, and wherein branching to the beginning of the loop or exiting the loop is controlled directly by the microcode unit using the second sequence field and the loop counter value.

2. The method as recited in claim 1 further comprising:
    executing another microcode operation from the microcode routine that precedes the body of the loop and that provides the loop counter value; and
    providing the loop counter value from a first functional unit that executes the operation.

3. The method as recited in claim 2 further comprising issuing the microcode operation that precedes the body from the microcode unit to the first functional unit, wherein the first functional unit is one of a plurality of functional units, and wherein the operation is restricted to issuance only to the first functional unit.

4. The method as recited in claim 1 wherein the second sequence field further indicates that the loop counter value is to be modified, and the method further comprises modifying the loop counter value in a loop counter register.

5. The method as recited in claim 4 wherein the modifying is subsequent to the determining.

6. The method as recited in claim 4 wherein the modifying is decrementing.

7. The method as recited in claim 1 wherein the first sequence field causes a sequential address to be fetched when the stalling is complete.

8. The method as recited in claim 1 wherein the second sequence field is coded to branch to the beginning of the loop until the loop counter value indicates that only a final iteration of the loop remains, and the method further comprises exiting the loop and performing operations corresponding to the final iteration of the loop in microcode operations that are after the body of the loop in the microcode routine responsive to the loop counter value indicating the final iteration.

9. A microcode unit for a processor, the microcode unit comprising:
a microcode memory storing a plurality of microcode routines executable by the processor, each microcode routine comprising two or more microcode operations; and
a sequence control unit coupled to the microcode memory, wherein the sequence control unit is configured to control reading microcode operations from the microcode memory to be issued for execution by the processor, and wherein the sequence control unit is configured to stall issuance of microcode operations forming a body of a loop in a first routine of the plurality of microcode routines until a loop counter value that indicates a number of iterations of the loop is received by the sequence control unit, wherein the stalled microcode operations are held at the microcode unit until the loop counter value is received by the sequence control unit, wherein each read of the microcode memory provides a plurality of microcode operations and a sequence field, and wherein the sequence field comprises a loop control field and a target field, and wherein the loop control field is coded to one of a plurality of encodings, and wherein the plurality of encodings include: a first encoding that indicates sequential execution, a second encoding that indicates stalling, and a plurality of branch encodings; and wherein the plurality of branch encodings each specify a different loop count test to determine whether or not to branch to a beginning of the loop, and wherein the target field specifies an address of the beginning of the loop when the loop control field is coded to one of the plurality of branch encodings, and wherein the sequence control unit is coupled to receive a first sequence field associated with the microcode routine and is configured to stall the issuance of microcode operations responsive to the first sequence field including the second encoding indicating the stall, wherein at least a second sequence field is associated with the body of the loop, and wherein the sequence control unit is configured to test the loop counter value responsive to the second sequence field including the loop control field coded to one of the plurality of branch encodings specifying the loop counter test to determine whether to branch to the beginning of the loop for another iteration of the loop or to exit the loop, and wherein the first routine excludes a branch microcode operation to branch to the beginning of the loop, and wherein branching to the beginning of the loop or exiting the loop is controlled directly by the sequence control unit using the second sequence field and the loop counter value.

10. The microcode unit as recited in claim 9 wherein the loop counter value is provided by a functional unit in the processor that executes a microcode operation from the first routine that precedes the body of the loop and is defined to provide the loop counter value.

11. The microcode unit as recited in claim 9 wherein the control unit in the sequence control unit is further configured to decrement the loop counter value in a loop counter register responsive to second sequence field associated with the body of the loop and to cause the loop counter register to update with the decremented loop counter value.

12. The microcode unit as recited in claim 11 wherein the control unit in the sequence control unit is configured to decrement the loop counter value in the loop counter register after the determination is made.

13. The microcode unit as recited in claim 9 wherein the control unit in the sequence control unit is configured not to modify the loop counter value in a loop counter register responsive to an encoding of a third sequence field that indicates a test of the loop counter value, wherein the encoding is useable to check for special cases of the loop counter value.

14. The microcode unit as recited in claim 9 wherein the sequence control unit is configured to fetch a sequential address in response to the first sequence field when the loop counter is received.

15. The microcode unit as recited in claim 9 wherein the second sequence field is coded to branch to the beginning of the loop until the loop counter value indicates that only a final iteration of the loop remains, and the sequence control unit is configured to exit the loop when the loop counter value indicates the final iteration, and wherein operations corresponding to the final iteration of the loop are performed in microcode operations that are after the body of the loop in the microcode routine.

16. A processor comprising:
a functional unit configured to execute a first microcode operation to provide a loop counter value to a microcode unit; and
the microcode unit coupled to receive the loop counter value from the functional unit, wherein a microcode routine comprising the first microcode operation also comprises a plurality of microcode operations forming a body of a loop, wherein the loop counter value specifies a number of iterations of the loop, and wherein the microcode unit is configured to stall issuance of the plurality of microcode operations from the microcode unit until the loop counter value is provided by the functional unit, and wherein the microcode unit comprises a microcode memory storing the microcode routine, wherein each read of the microcode memory provides two or more microcode operations and a sequence field, and wherein the sequence field comprises a loop control field and a target field, and wherein the loop control field is coded to one of a plurality of encodings, and wherein the plurality of encodings include: a first encoding that indicates sequential execution, a second encoding that indicates stalling, and a plurality of branch encodings; and wherein the plurality of branch encodings each specify a different loop count test to determine whether or not to branch to a beginning of the loop, and wherein the target field specifies an address of the beginning of the loop when the loop control field is coded to one of the plurality of branch encodings, and wherein the microcode unit is coupled to receive a first sequence field associated with the microcode routine and is configured to stall the issuance of microcode operations responsive to the loop control field in the first sequence field having the second encoding indicating the stall, wherein at least a second sequence field is associated with the microcode operations that form the body of the loop, and wherein the microcode unit is configured to test the loop counter value responsive to the loop control field in the second sequence field having one of the plurality of branch encodings to determine whether to generate the target address to branch to the beginning of the loop for another iteration of the loop or to generate a second address to exit the loop, and wherein the microcode routine excludes a branch microcode operation to branch to the beginning of the loop, and wherein branching to the beginning of the loop or exiting the loop is directly controlled by the microcode unit using the second sequence field and the loop counter value.

17. The processor as recited in claim 16 wherein the control unit in the microcode unit is further configured to decrement the loop counter value in a loop counter register responsive to the second sequence field associated with the body of the loop.

18. The processor as recited in claim 17 wherein the control unit in the microcode unit is configured to decrement the loop counter value in the loop counter register after the determination is made.

19. The processor recited in claim 16 wherein the microcode unit is configured to fetch a sequential address in response to the first sequence field when the loop counter is received.

20. The processor as recited in claim 16 wherein the second sequence field is coded to branch to the beginning of the loop until the loop counter value indicates that only a final iteration of the loop remains, and the microcode unit is configured to exit the loop when the loop counter value indicates the final iteration, and wherein operations corresponding to the final iteration of the loop are performed in microcode operations that are after the body of the loop in the microcode routine.

* * * * *